June 14, 1966 K. D. BROADBENT 3,256,483

MAGNETO-RESISTIVE SENSING DEVICE

Filed June 15, 1961

Kent D. Broadbent,
*INVENTOR.*

*BY.*

Leonard Golove

*ATTORNEY.*

United States Patent Office 3,256,483
Patented June 14, 1966

3,256,483
MAGNETO-RESISTIVE SENSING DEVICE

Kent D. Broadbent, San Pedro, Calif., assignor, by mesne assignments, to Interstate Electronics Corporation, a corporation of California Filed June 15, 1961, Ser. No. 117,202
11 Claims. (Cl. 324—65)

This invention relates to a magnetic device and more particularly to a device for determining the magnetic state of a magnetic domain established in a magnetic medium.

Devices constructed principally of relatively thin films of conducting, insulating and magnetic materials for shifting the position of a magnetic domain on a magnetic medium have been described. One such device is shown in U.S. Patent No. 2,919,432, inventor Kent D. Broadbent, issued December 29, 1959. The effective use of such a device, as well as other devices which require that the magnetic state of a magnetic medium be sensed, requires an efficient sensing element for detecting the magnetic state of such a medium. A very commonly used sensing element comprises an electrical conductor which is looped around the magnetic medium at the position on said medium at which the magnetic state of said medium is to be sensed. The reference given above teaches the use of such a sensing element. However, a conducting loop is not always the most desirable type of sensing element since it is relatively difficult to manufacture in a device constructed principally of thin films and since its effective utilization is limited by the size of the magnetic medium which it encompasses.

An alternative readout or sensing element may be provided by sensing the electrical resistance between two points on the magnetic medium. It is well known that the magnetic state of a medium affects the electrical resistivity of the medium. This effect, which may be extremely complex in origin, is known as the magneto-resistive effect. A discussion of the magneto-resistive effect in ferromagnetic materials such as may be used as a magnetic medium may be found at pages 66–74 of Solid State Physics, vol. 5, edited by Frederick Seitz and David Turnbull, published by Academic Press, Inc., N.Y., 1957.

Magneto-resistive devices, in addition, are more suitable for use in the increasingly smaller devices presently sought for modern computer developments than are the older loop sensing elements. This advantage is based on the dependence of the loop sensor on the size of the magnetic medium for its output signal. Although the loop sensor output signal depends in magnitude upon the size of the magnetic medium enveloped by the sensing loop, this size dependence is not nearly as significant in the case when magneto-resistive sensing is used.

However, experiments have shown that the magneto-resistive effect provides a relatively small output signal when used in the manner described in the prior art. This relatively small output signal makes the use of a magneto-resistive sensing element extremely difficult and unreliable.

Thus, an object of this invention is to provide a novel sensing element which yields a relatively large output signal.

Another object of this invention is to provide an improved sensing element which utilizes the magneto-resistive effect.

Still another object of this invention is to provide an improved sensing element which is useful in extremely small magnetic devices.

Further and additional objects will become apparent from the study of the following specification and drawings in which.

Figure 1A:
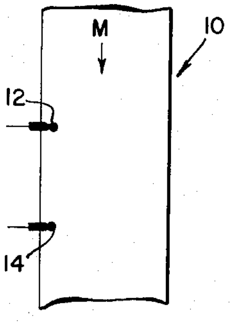
FIG. 1A shows a magnetic medium having an initial state of magnetization and indicating longitudinal magneto-resistive sensing.
Figure 1B:
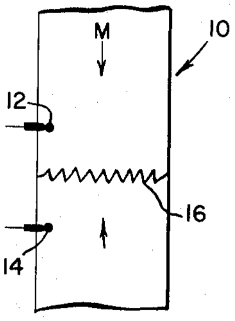
FIG. 1B shows the magnetic medium of FIG. 1 into which an antiparallel magnetic domain has been introduced.
Figure 2A:
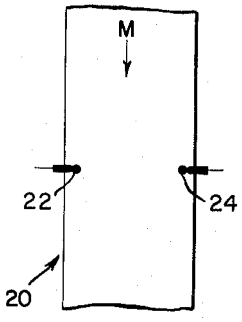
FIG. 2A shows a magnetic medium having an initial state of magnetization and indicating transverse magneto-resistive sensing.
Figure 2B:
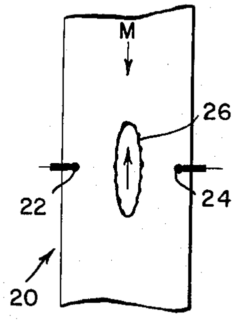
FIG. 2B shows the magnetic medium of FIG. 2A into which an antiparallel magnetic domain has been introduced.

The present invention provides the advantages listed above by the use of a magnetic medium of relatively complex internal structure. The detailed description of the structure of the medium will follow. However, it is first desirable to discuss broadly the nature of the magneto-resistive effect and its use to provide a sensing element for determining the magnetic state of the medium. In FIG. 1A, the electrical resistance is sensed along the magnetic strip 10 between points 12 and 14, separated longitudinally on the strip 10. A small change in resistance occurs when magnetic domain wall 16 is introduced between points 12 and 14 as shown in FIG. 1B. In FIG. 2A, the electrical resistance is sensed across the magnetic strip 20 between points 22 and 24 separated transversely on the strip 20. A small change in resistance occurs when an antiparallel magnetic domain 26 is introduced between points 22 and 24 as shown in FIG. 2B.

In the configuration shown in FIGS. 1 and 2, the change of resistance is observed to be proportional to the number of magnetic domain walls present between the resistance measuring points. Thus, it is evident that, in order to increase the magnitude of the change of resistance produced between measuring points, it is desirable to increase the number of magnetic domain walls between the measuring points. This objective can be achieved by employing a plurality of magnetic domains to represent a single bit of information.

Figure 3:
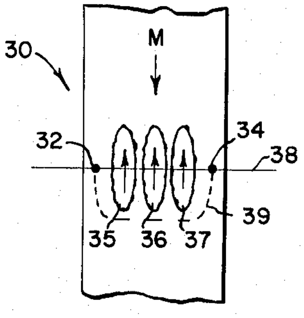
FIG. 3 shows a magnetic medium having an initial state of magnetization and indicating transverse magneto-resistive sensing into which a plurality of antiparallel magnetic domains has been introduced.

Such a configuration is shown in FIG. 3. This configuration has been observed as an undesirable effect in zone propagation shift registers, as described in the Broadbent patent referred to hereinabove, in which a looping electrode was employed as a sensing element. However, when magneto-resistive readout is employed, this configuration does represent an improvement. In FIG. 3 a magnetic medium 30 is shown as provided with a pair of transversely separated resistance sensing points 32 and 34. The introduction of a plurality of antiparallel magnetic domains 35, 36 and 37 has been shown to yield a proportionately greater change of resistance than the change of resistance observed by the use of the configuration shown in FIG. 2. However, the geometry of the magnetic domain cluster shown in FIG. 3 is extremely difficult to predict in advance or to control when a uniform magnetic medium is used as shown. Further, due to the relatively small length to width ratio of the antiparallel magnetic domains which occur in these "natural" semielliptical domains, a relatively large number of walls per unit of length measured on the straight line 38 between points 32 and 34, implies a relatively short "shunt path" length measured on the dotted line 39. It is the ratio of the lengths of the two paths, i.e., the straight path between points 32 and 34 and the shunt path therebetween, along with the magnitude of the additional resistance introduced by the occurrence of magnetic domain walls between points 32 and 34, which sets a practical limit on the magnitude of the change in resistance which is useful for readout purposes. Thus, the improvement provided by the use of a plurality of magnetic domains to represent a single bit of information is severely limited.

It has been stated above that the change in resistance between two points in a magnetic medium is proportional to the change in the number of magnetic domain walls between said two points. Since this phenomenon is not generally understood, an explanation of its existence will be offered below. However, it is to be understood that, while the explanation given appears to be reasonably correct, the description of magnetization phenomena is not offered as a complete or quantitative explanation. In actuality magnetic domain formation and interaction is known to be extremely complex and the relatively simple explanation offered herein may not fully describe the principles or operation of this invention. It should be further understood that the simplified description of magnetization phenomena presently believed to account for the operation of this invention is merely supplied for explanatory purposes and that the utility of the invention does not depend upon the accuracy of those principles suggested.

The change in resistance between two points measured transversely on a magnetic medium is due to a change of resistivity of the medium occasioned by the existence of magnetic domains between the measuring points. One of the principal mechanisms believed to be responsible for this change of resistivity is the Lorentz force bending of the path of the conduction electrons present in the magnetic medium produced by the magnetic dipoles within a magnetic domain wall. In a magnetic medium, if the magnetic induction $\overline{B}$ is parallel to the electron velocity $\overline{V}$, there is little magnetic interaction since the Lorentz force is equal to $(e\overline{V}\times\overline{B})$, where $e$ is the charge on an electron. However, in a region where the magnetic induction $\overline{B}$ is not parallel to the direction of the electron velocity $\overline{V}$, there is an interaction which increases the path length of the conduction electrons and which consequently yields an increase in resistance. This increase in resistance is evidently proportional to the number of magnetic domain walls traversed by the conduction electrons. Since it is known that the magnetic dipoles forming a magnetic domain wall are generally disposed at orientations different than the dipoles constituting the magnetic state of the medium adjacent the domain wall, it is evident that the existence of a domain wall will locally disturb the direction of the magnetic induction $\overline{B}$, causing a change in the Lorentz force upon conduction electrons and a consequent change in the resistivity of the magnetic medium. While other effects are also known to contribute to the effect described above, it is the Lorentz force bending which is believed to be principally responsible for the phenomena utilized by the present invention.

Figure 4:
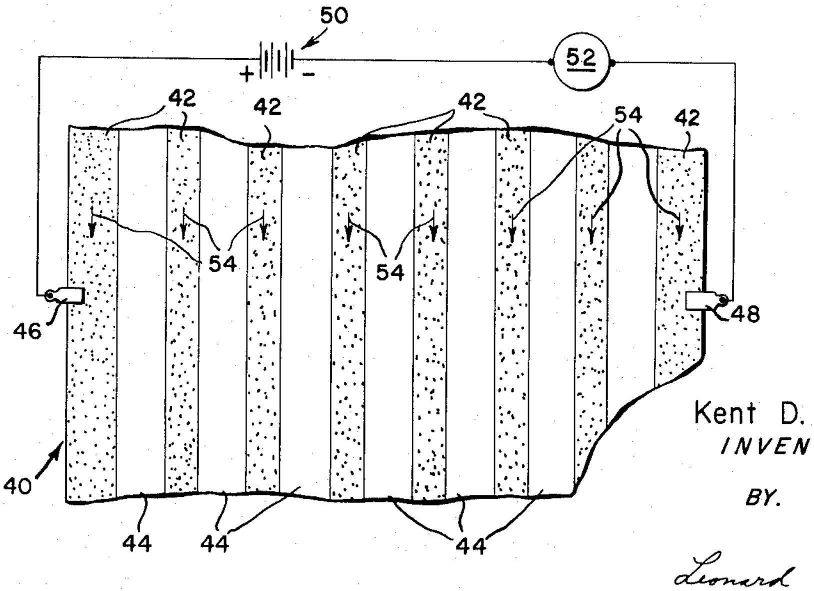
FIG. 4 shows a magnetic medium constructed according to the principles of the present invention and showing the use of transverse magneto-resistive sensing.

FIG. 4 shows the details of construction of a magnetic medium which effectively and uniformly provides a plurality of magnetic domains having a relatively large length to width ratio so that the magnetic shunt path effect is considerably reduced. FIG. 4 shows a magnetic medium 40 comprising a plurality of relatively thin strips of magnetically soft material 42 separated by strips of relatively hard magnetic material 44. It should be understood that magnetic hardness represents a medium exhibiting relatively high magnetic coercive force and that magnetic softness represents a material exhibiting relatively low magnetic coercive force. The magnetic medium 40 may have a thickness of approximately 1000 A. A conducting electrode 46 is applied to one side of the magnetic medium 40 and a second conducting electrode 48 is applied to the other side of the magnetic medium 40. The state of the medium 40 will be sensed by measuring the electrical resistance between the electrodes 46 and 48. This can be accomplished by passing an electric current between the electrodes 46 and 48 while observing the current between said electrodes. A change in resistance between the electrodes 46 and 48, i.e., in the magnetic medium, will produce a consequent change in current. Thus a battery 50 supplies electric current to the electrodes 46 and 48 and a suitable ammeter 52 measures the current between the electrodes 46 and 48. In operation, more sophisticated circuits for measuring the resistance between the electrodes 46 and 48 may be employed.

Initially, the magnetically hard regions 44 are magnetized in a first direction, shown downward by arrows 54. The hard regions retain their initial magnetization during all normal operation of the device. During the operation of the device, the "zero" state is represented by a downward polarization of the soft regions 42 shown in FIG. 4. In this state there are two domain walls for every hard strip lying between the electrodes 46 and 48 and electrical resistance exhibits maximum change from said particular value. Since the energy required to change the magnetic polarization of a hard region may be made extremely high, operation of the device which merely requires controlling the magnetic state of the soft regions 42 will not affect the magnetic state of the hard regions 44. Since the length of a magnetic domain may now be controlled, the magnetic domains may be made to have a relatively high length to width ratio and the shunt path between the electrodes 46 and 48 may be made relatively long and consequently ineffective as a limitation on the operation of the device.

Processes which have yielded sufficient hardening of the desired areas of the magnetic medium are well known in the art and have been utilized experimentally for the production of the present invention. Several such processes have been suggested and tested. These include vacuum depositing or otherwise providing a thin film of a hardening element such as copper, aluminum, etc. in those areas in which magnetic hardness is desired and subsequent heating of the magnetic medium. At relatively high temperatures, the hardening element diffuses in the magnetic material and produces a "doped" region exhibiting magnetic hardness or high coercive force. Other techniques for hardening selected areas consist of decreasing the thickness of those areas desired to be hardened relative to the thickness of the desired soft areas. Still another technique is that of processing portions of the substrate surface onto which the magnetic medium is deposited, such as by chemical etching of those portions of the substrate surface which underlie the desired hard regions. Such a roughening of the substrate surface alters the structure of the deposited magnetic material and increases the magnetic hardness of those regions of the magnetic film which have been deposited on the roughened surface.

It will now be appreciated that a novel and improved readout element for use in a thin film magnetic device has been disclosed. This device offers the advantage of easier construction and higher output signal levels than devices known in the prior art.

What is claimed is:

1. A magnetic device comprising a polarizable elongated magnetic medium alternatively magnetizable in either of two states of magnetization, said medium comprising two portions extending longitudinally along said medium and having a relatively low magnetic hardness and a separating portion extending longitudinally along said medium between said two portions and having a relatively high magnetic hardness, and means responsive to the magnetic state of said medium for providing electrical signals in accordance therewith.

2. A magnetic device comprising a polarizable elongated magnetic medium alternatively magnetizable in either of of two states of magnetization, said medium comprising a plurality of portions extending longitudinally along said medium and having a relatively low magnetic hardness and a separating portion extending longitudinally along said medium between each portion of said plurality adjacent another such portion, said separating portion having a relatively high magnetic hardness, and means responsive to the magnetic state of said medium for providing electrical signals in accordance therewith.

3. A magnetic device comprising a polarizable elongated magnetic medium comprising two portions extending longitudinally along said medium and having a relatively low magnetic hardness, said two portions adapted to assume first and second states of magnetization, and a separating portion extending longitudinally along said medium between said two portions and having a relatively high magnetic hardness, said separating portion having said first state of magnetization, and means responsive to the magnetic state of said two portions of said medium for providing electrical signals in accordance therewith.

4. A magnetic device comprising a polarizable elongated magnetic medium comprising a plurality of portions extending longitudinally along said medium and having a relatively low magnetic hardness, said plurality of portions adapted to assume first and second states of magnetization, and a separating portion extending longitudinally along said medium between each portion of such plurality adjacent another such portion, said separating portion having a relatively high magnetic hardness and further having said first state of magnetization, and means responsive to the magnetic state of said plurality of portions of said medium for providing electrical signals in accordance therewith.

5. A magnetic device comprising a polarizable elongated magnetic medium alternatively magnetizable in either of two states of magnetization, said medium comprising two portions extending longitudinally along said medium and having a relatively low magnetic hardness, and a separating portion extending longitudinally along said medium between said two portions and having a relatively high magnetic hardness, and means for detecting changes in the electrical resistivity of a portion of said medium and for providing electrical singals in accordance therewith.

6. A magnetic device comprising a polarizable elongated magnetic medium alternatively magnetizable in either of two states of magnetization, said medium comprising a plurality of portions extending longitudinally along said medium and having a relatively low magnetic hardness, and a separating portion extending longitudinally along said medium between each portion of said plurality adjacent another such portion, said separating portion having a relatively high magnetic hardness, and means for detecting changes in the transverse electrical resistivity of a portion of said medium and for providing electrical signals in accordance therewith.

7. A magntic device comprising a polarizable elonagted magnetic medium comprising a pluarlity of portions extending longitudinally along said medium and having a relatively low magnetic hardness, said plurality of portions adapted to assume first and second states of magnetization, and a separating portion extending longitudinally along said medium between each portion of such plurality adjacent another such portion, said separating portion having a relatively high magnetic hardness, and means for detecting changes in the transverse electrical resistivity of a portion of said medium and for providing electrical signals in accordance therewith.

8. A magnetic device comprising a polarizable elongated magnetic medium alternatively magnetizable in either of two states of magnetization, said medium comprising two portions extending longitudinally along said medium and having a relatively low magnetic hardness and a separating portion extending longitudinally along said medium between said two portions and having a relatively high magnetic hardness, a pair of electrically conducting terminals, the first of said terminals maintained in electrical contact, with one side of said medium and the second of said terminals maintained in electrical contact at the opposite side of said medium, and electrical resistance measuring means connected between said terminals for providing electrical signals upon the occurrence of a change in resistance between said electrical terminals.

9. A magnetic device comprising an elongated magnetic medium alternatively magnetizable in either of two states of magnetization, said medium comprising a plurality of portions extending longitudinally along said medium and having a relatively low magnetic hardness and a separating portion extending longitudinally along said medium between each portion of said plurality adjacent another such portion, said separating portion having a relatively high magnetic hardness, a pair of electrically conducting terminals, the first of said terminals maintained in electrical contact with one side of said medium and the second of said terminals maintained in electrical contact at the opposite side of said medium at a point transverse to said first terminal, and electrical resistance measuring means connected between said terminals for providing electrical signals upon the occurrence of a change in resistance between said electrical terminals.

10. A magnetic device comprising an elongated magnetic medium comprising two portions extending longitudinally along said medium and having a relatively low magnetic hardness, said two portions adapted to assume first and second states of magnetization, and a separating portion extending longitudinally along said medium between said two portions and having a relatively high magnetic hardness, a pair of electrically conducting terminals, the first of said terminals maintained in electrical contact with one side of said medium and the second of said terminals maintained in electrical contact at the opposite side of said medium at a point transverse to said first terminal, and electrical resistance measuring means connected between said terminals for providing electrical signals upon the occurrence of a change in resistance between said electrical terminals.

11. A magnetic device comprising an elongated magnetic medium comprising a plurality of portions extending longitudinally along said medium and having a relatively low magnetic hardness, said plurality of portions adapted to assume first and second states of magnetization, and a separating portion extended longitudinally along said medium between each portion of such plurality adjacent another such portion, said separating portion having a relatively high magnetic hardness, a pair of electrically conducting terminals, the first of said terminals maintained in electrical contact with one side of said medium and the second of said terminals maintained in electrical contact at the opposite side of said medium at a point transverse to said first terminal, and electrical resistance measuring means connected between said terminals for providing electrical signals upon the occurrence of a change in resistance between said electrical terminals.

References Cited by the Examiner

UNITED STATES PATENTS

| | | | |
|---|---|---|---|
| 2,391,678 | 12/1945 | Bundy | 340—11 |
| 2,566,984 | 9/1951 | Firth. | |
| 2,998,840 | 9/1961 | Davis | 340—174 |

WALTER L. CARLSON, *Primary Examiner.*

J. P. O'BRIEN, CHARLES F. ROBERTS, *Assistant Examiners.*